US008229680B2

(12) United States Patent
Liu et al.

(10) Patent No.: US 8,229,680 B2
(45) Date of Patent: Jul. 24, 2012

(54) METHOD AND APPARATUS FOR LOOSENING OF FASTENERS ON STRUCTURES

(75) Inventors: Bao Liu, Cupertino, CA (US); Lien Ouyang, Los Altos, CA (US); Shawn J. Beard, Livermore, CA (US); Irene Li, Stanford, CA (US); Fu-Kuo Chang, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 430 days.

(21) Appl. No.: 12/432,659

(22) Filed: Apr. 29, 2009

(65) Prior Publication Data

US 2009/0276168 A1 Nov. 5, 2009

Related U.S. Application Data

(60) Provisional application No. 61/049,368, filed on Apr. 30, 2008.

(51) Int. Cl.
*G01N 29/14* (2006.01)

(52) U.S. Cl. ............... 702/33; 702/56; 73/76; 324/242; 324/240; 324/658

(58) Field of Classification Search .................. 702/33, 702/56; 73/761, 799, 587, 594, 769; 324/242, 324/225, 235, 240, 241, 243, 658, 659
See application file for complete search history.

(56) References Cited

U.S. PATENT DOCUMENTS

| | | | | |
|---|---|---|---|---|
| 3,713,127 A * | 1/1973 | Keledy et al. ............... 340/540 |
| 4,014,208 A * | 3/1977 | Moore et al. .................... 73/629 |
| 4,956,999 A * | 9/1990 | Bohannan et al. .............. 73/587 |
| 5,048,320 A * | 9/1991 | Mitsuhashi et al. ......... 73/12.09 |
| 5,510,709 A * | 4/1996 | Hurley et al. .................. 324/242 |
| 6,037,768 A * | 3/2000 | Moulder et al. .............. 324/225 |
| 6,370,964 B1 | 4/2002 | Chang et al. |
| 7,322,244 B2 * | 1/2008 | Kim ................................ 73/587 |
| 7,413,919 B2 | 8/2008 | Qing et al. |
| 7,528,598 B2 * | 5/2009 | Goldfine et al. .............. 324/240 |
| 7,584,075 B2 * | 9/2009 | Kim ............................. 702/183 |
| 7,590,510 B2 * | 9/2009 | Kim ............................. 702/183 |
| 7,596,470 B2 * | 9/2009 | Kim ............................. 702/183 |
| 7,762,142 B2 * | 7/2010 | Rakow et al. ................... 73/761 |
| 2005/0075846 A1 * | 4/2005 | Kim ................................. 703/1 |
| 2007/0012112 A1 * | 1/2007 | Kim ................................ 73/594 |
| 2007/0205338 A1 * | 9/2007 | Sabatino .................... 248/125.7 |

(Continued)

FOREIGN PATENT DOCUMENTS

JP 05231824 A * 9/1993

*Primary Examiner* — Carol Tsai
(74) *Attorney, Agent, or Firm* — Innovation Counsel LLP

(57) ABSTRACT

Methods and apparatuses for detecting fastener loosening. Sensors query a structure at a baseline value of an environment variable, such as temperature, and this baseline signal is stored for later use. Subsequently, users can query the structure remotely and at any time, and the signals from these queries are compared to the stored baseline signal. In some embodiments, an index is calculated, and the system determines that one or more fasteners have come loose if the calculated index exceeds a predetermined threshold value. It is desirable to select a time window within which the query signal is most sensitive to fastener loosening but least sensitive to variations in the environment variable. Accordingly, embodiments of the invention include methods and apparatuses for determining an optimal time window for use in calculating the above described index.

49 Claims, 4 Drawing Sheets

U.S. PATENT DOCUMENTS

| | | | |
|---|---|---|---|
| 2007/0260425 A1* | 11/2007 | Kim | 702/182 |
| 2007/0260427 A1* | 11/2007 | Kim | 702/185 |
| 2007/0265806 A1* | 11/2007 | Kim | 702/187 |
| 2007/0265808 A1* | 11/2007 | Kim | 702/188 |
| 2009/0071078 A1* | 3/2009 | Rakow et al. | 52/1 |
| 2010/0162825 A1* | 7/2010 | Karp et al. | 73/799 |
| 2010/0319452 A1* | 12/2010 | Masuda | 73/594 |
| 2011/0130915 A1* | 6/2011 | Wright et al. | 701/32 |

* cited by examiner

# METHOD AND APPARATUS FOR LOOSENING OF FASTENERS ON STRUCTURES

PRIORITY

This application claims the benefit of U.S. Provisional Patent Application No. 61/049,368, filed on Apr. 30, 2008, the entire content of which is hereby incorporated by reference.

BRIEF DESCRIPTION OF THE INVENTION

This invention relates generally to structural health monitoring. More specifically, this invention relates to detection of fastener loosening in structures.

BACKGROUND OF THE INVENTION

In recent years, structural health monitoring technologies have been increasingly employed to monitor and detect fastener loosening. The loosening of fasteners on structures can be of great concern, especially when those structures operate in harsh environments or when fasteners are in locations that are difficult to monitor. For example, loosening of bolts or other fasteners on the outer surfaces of a space vehicle can result in loss of pressure or hot gases entering the vehicle during re-entry, possibly resulting in catastrophic failure. As another example, bolts within difficult-to-access areas such as the interior of an airplane wing may be difficult to monitor manually, making it desirable to develop methods of remotely monitoring such fasteners.

Accordingly, it is increasingly desirable to develop and improve methods for detecting loosening of fasteners on structures.

SUMMARY OF THE INVENTION

The invention can be implemented in a number of ways, including as a method and as a computer-readable medium.

In one embodiment, a method of detecting a loosening of a fastener on a structure comprises retrieving a first set of data corresponding to a first signal transmitted through a structure having a fastener, and determining a second set of data corresponding to a second signal transmitted through the structure. A value of an index is then calculated according to the first set of data and the second set of data. The calculated index value is compared to a predetermined threshold value, and loosening of the fastener is determined according to the comparing.

In another embodiment, a method of detecting a loosening of a fastener on a structure comprises querying a structure by transmitting first signals through the structure, receiving first data corresponding to the transmitted first signals, and retrieving second data corresponding to second signals transmitted through the structure. The method then includes calculating a value of an index at least partially according to the first data and the second data, comparing the calculated index value to a threshold value, and determining a loosening of the fastener on the structure when the calculated index value exceeds the threshold value.

In a further embodiment, a method of determining an optimal time window for facilitating detection of a loosening of a fastener on a structure comprises determining a first set of data corresponding to first signals transmitted through the structure, differing ones of the first signals transmitted through the structure at differing values of an environment variable. Also determined are values of an objective function for various time windows, wherein the respective values are determined at least partially according to a portion of the first set of data corresponding to the respective time window. The optimal time window is determined according to a one of the various time windows corresponding to a maximum one of the values.

In a still further embodiment, a computer-readable medium stores instructions for carrying out a method of detecting a loosening of a fastener on a structure. The method comprises retrieving a first set of data corresponding to a first signal transmitted through a structure having a fastener, and determining a second set of data corresponding to a second signal transmitted through the structure. A value of an index is then calculated according to the first set of data and the second set of data. The calculated index value is compared to a predetermined threshold value, and the loosening of the fastener is determined according to the comparing.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

In one embodiment, embodiments of the invention relate to methods and apparatuses for detecting fastener loosening. One or more sensors, which can be piezoelectric (PZT) sensors, are installed on a structure, where they can query fasteners on that structure to determine whether they have come loose. The sensors query the structure at a baseline value of an environment variable, such as temperature, and this baseline signal is stored for later use. Subsequently, users can query the structure remotely and at any time, and the signals from these queries are compared to the stored baseline signal. In some embodiments, an index is calculated, and the system determines that one or more fasteners have come loose if the calculated index exceeds a predetermined threshold value.

Two points should be made regarding the index. First, it has been found that loosening of fasteners causes the signals used to query the structure to vary more in amplitude. In contrast, variation in temperature, at least within a certain range, causes the signals to vary more in phase. Accordingly, to make the methods and apparatuses of the invention more sensitive to loosening of fasteners but less sensitive to temperature, some embodiments calculate an index employing envelopes of the query signals and the baseline signals, rather than the original signal waveforms. That is, by utilizing an index that is a function of the signal envelopes, embodiments of the invention can be made more robust, and able to tolerate greater variations in temperature while still reliably detecting fastener loosening.

Second, it is desirable to select a time window within which the query signal is most sensitive to fastener loosening but least sensitive to variations in the environment variable. Accordingly, embodiments of the invention include methods and apparatuses for determining an optimal time window for use in calculating the above described index.

Aspects of the invention relate to loosening of "fasteners," which can include any apparatus employed to couple portions of a structure together, or couple objects to a structure. This can include bolts, rivets, screws, and the like. Additionally, a "loosening" of any such fastener, as used herein, can include any lessening of any degree to which such a fastener is coupled to a structure. For example, the term "loosening" can refer to a reduction in the torque or angular displacement to which a bolt is attached. Also, the above referenced "environment variable" can refer to any appropriate physical state, such as temperature or any other.

Figure 1A:
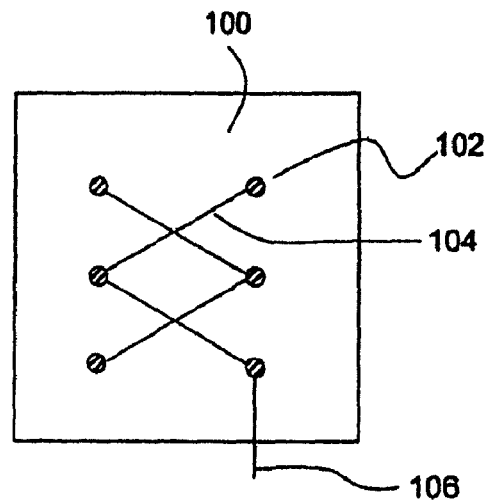
FIGS. 1A-1C illustrate an exemplary sensor system that can be used in conjunction with embodiments of the present invention.

Embodiments of the invention can employ any PZT sensors capable of detecting the loosening of fasteners on a structure. For purposes of illustration, one exemplary sensor system is shown in FIG. 1A, which shows a flexible sensing layer that can be used in accordance with embodiments of the present invention. A diagnostic layer 100 is shown, which contains an array of sensors 102. The sensors 102 can be any sensors capable of generating and receiving signals used in structural health monitoring such as stress waves, and are connected to conductive traces 104. The traces 104 connect (or interconnect, if necessary) sensors 102 to one or more output leads 106 configured for connection to a processor or other device capable of analyzing the data derived from the sensors 102.

Figure 1B:
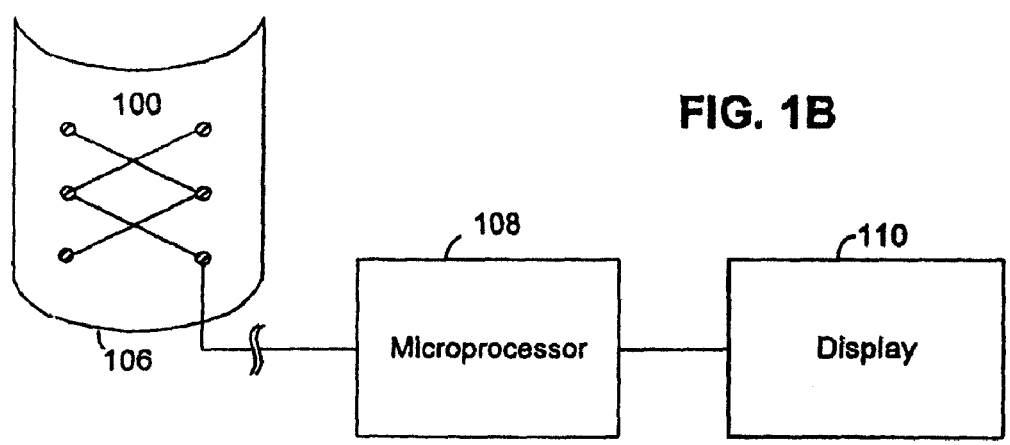

The diagnostic layer 100 and its operation are further described in U.S. Pat. No. 6,370,964 to Chang et al., which is hereby incorporated by reference in its entirety and for all purposes. Construction of the diagnostic layer 100 is also explained in U.S. Pat. No. 7,413,919 to Qing et al., which is also incorporated by reference in its entirety and for all purposes. It should be noted that the present invention is not limited to the embodiments disclosed in the aforementioned U.S. Pat. No. 7,413,919, but instead encompasses the use of flexible sensor layers having any configuration. For illustration, FIG. 1B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess various aspects of the health of the structure. For instance, detected stress waves can be analyzed to detect crack propagation within the structure, delamination within composite structures, or the likelihood of fatigue-related failure. Quantities such as these can then be displayed to the user via display 110.

Figure 1C:
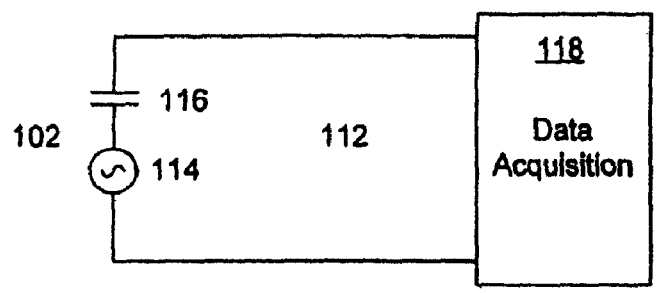

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. These piezoelectric transducers can also act as actuators, converting an applied voltage to a stress wave signal.

Figure 2:
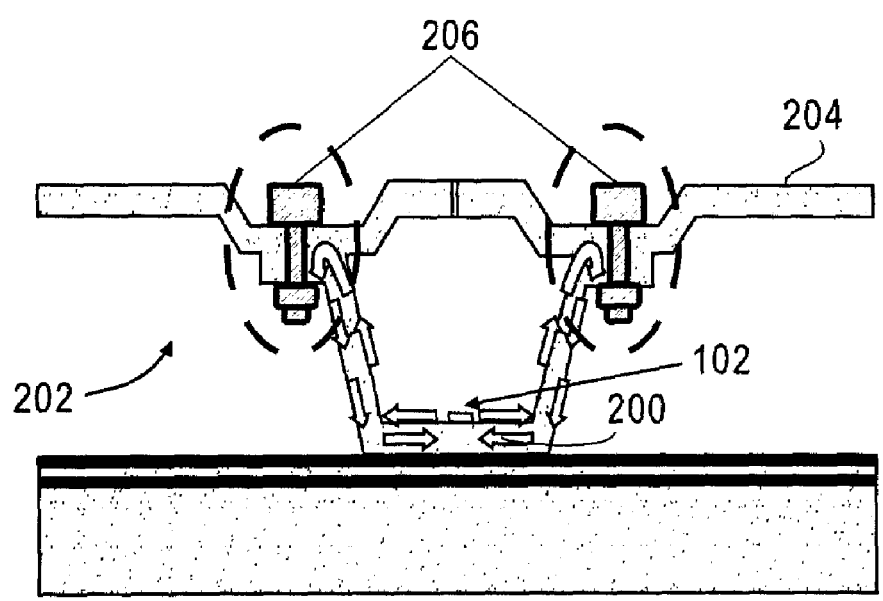
FIG. 2 is a cross-sectional view of a structure with sensor querying fasteners on the structure, so as to determine a loosening of the fasteners in accordance with embodiments of the present invention.

FIG. 2 is a cross-sectional view of a structure, illustrating a sensor 102 that can be used to query a structure to determine whether any fasteners have loosened. Here, sensor 102 is placed on a first portion 200 of a structure 202, and is employed to determine whether the first portion 200 of the structure 202 has at least partially decoupled from a second portion 204 of the structure 202. That is, bolts 206 couple the first and second portions 200, 204 together, and the sensor 102 can be employed to determine whether the bolts 206 have loosened.

In operation, sensor 102 can operate in pulse-echo mode, first transmitting a stress wave pulse through the structure 202. The data acquisition unit 118 then switches to sense the reflected and/or dispersed stress wave pulse as it returns to the sensor 102. The resulting detected stress wave contains information relating to the degree to which the bolts 206 are loosened. This process can be carried out a number of times at different values of an environment variable to, for instance, determine "baseline" signals describing a baseline amount of loosening of the bolts 206 at a baseline temperature, or to query the structure 202 and bolts 206 at later times to determine whether bolts 206 have loosened.

Figure 3:
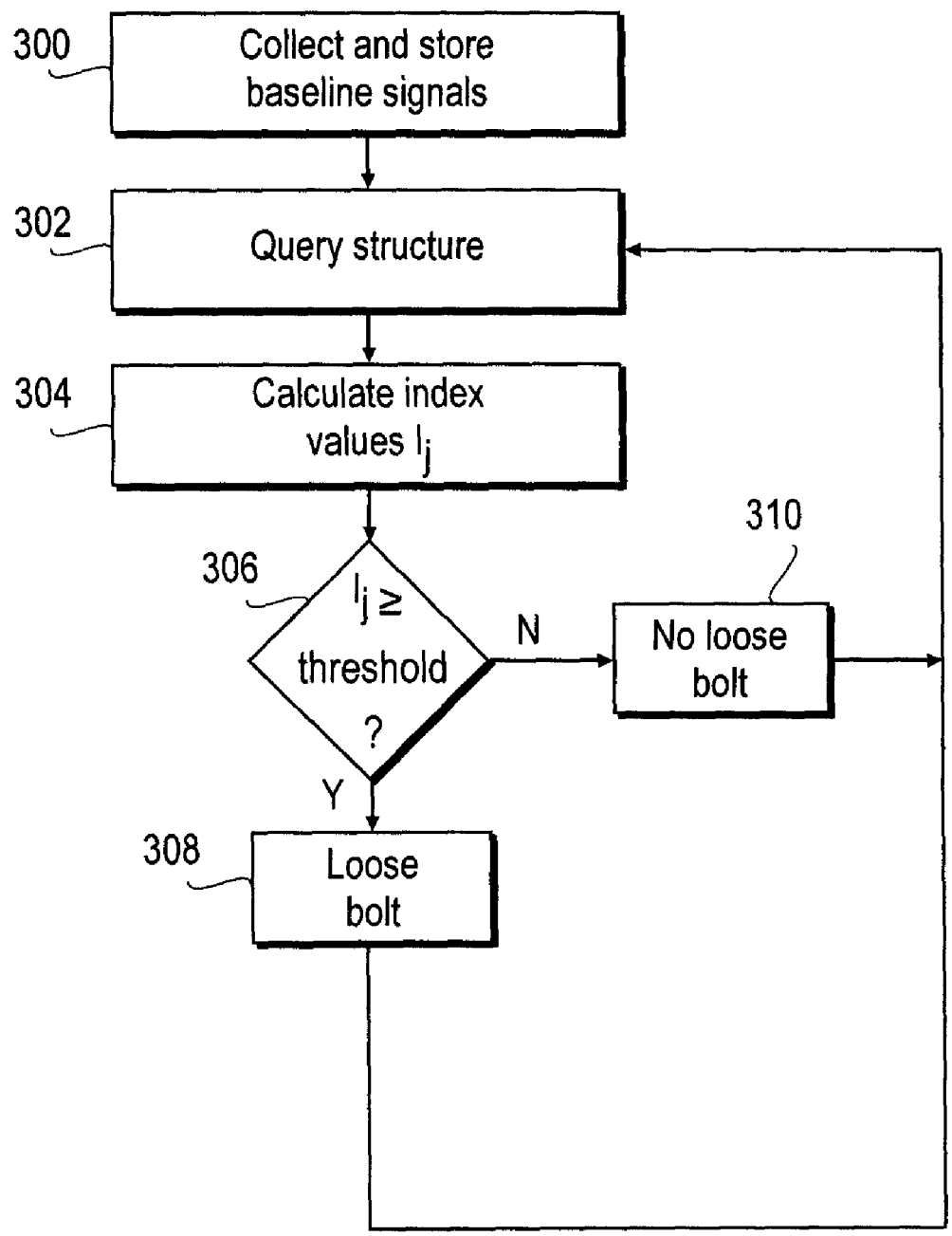
FIG. 3 is a flowchart of steps employed in detecting fastener loosening.

In particular, this process can be carried out according to the flowchart of FIG. 3. First, the data acquisition unit 118 collects and stores baseline signals (step 300). This step can be accomplished as above, with sensors 102 transmitting signal pulses through structure 202 at a baseline value of the environment variable, and detecting/sampling the dispersed, reflected signal. The sampled signal points are then stored in memory within microprocessor (i.e., computer) 108.

As the detected signal was reflected/dispersed at least partially from the bolts 206, the sampled signal contains information as to the baseline degree of loosening of the bolts 206 at the baseline temperature. At any subsequent time, the structure 202 can then be queried (step 302) to ascertain whether the bolts 206 have loosened since the baseline signal was taken. The microprocessor 108 initiates transmission of signal pulses from the sensors 102, generating stress waves through the structure. The resulting reflected/dispersed stress waves are detected at the sensors 102 and sampled by the microprocessor 108. Once this new signal is sampled, the microprocessor 108 calculates an index value utilizing both the new signal and the stored baseline signal (step 304). The invention contemplates use of any suitable index, calculated in any manner. However, one index that has been found to beneficial is determined according to:

$$I = \frac{\sum_{k=t1}^{t2} |y^e(k) - x^e(k)|}{\sum_{k=t1}^{t2} |x^e(k)| + \sum_{k=t1}^{t2} |y^e(k)|} \qquad (1)$$

where $x^e$ represents envelope values of the stored baseline signal, $y^e$ represents envelope values of "new" signal, and t1 and t2 are the start and end times, respectively, of the time window during which the baseline and new signals are to be analyzed. From equation (1), it can be seen that, in this embodiment, only that portion of the baseline and new signals that falls within this time window is used in calculating the index. That is, in calculating the index, those portions of the baseline and new signals collected outside the time window are not employed in calculating I.

Once the value of index I is determined, it is compared to a predetermined threshold value (step 306), which may also be stored in memory within microprocessor 108. While the invention contemplates use of any threshold value, and such values will vary according to structure, sensors used, etc., it has been found that a threshold value of between approximately 0.1 and 0.2 is preferable in some applications, with a value of approximately 0.15 used as a nominal value. If the calculated value of index I exceeds the threshold value it is deemed that a bolt 206 has loosened (step 308). Conversely, if I does not exceed this threshold, it is deemed that no bolt 206 has loosened (step 310).

As above, it has been found that the phase of the signals received at the sensor 102 varies with temperature. Accordingly, in at least some applications it is preferable to formulate indices that utilize amplitude rather than phase, so that the calculated index values are less sensitive to variations in temperature. Furthermore, it has also been found that the envelopes of the baseline and new signals better highlight differences between the two when fasteners loosen. Equation (1) therefore employs envelope values of the stored baseline signal and any later-received signals. By employing envelope values, which are a function of maximum amplitude values and are independent of phase, the index of equation (1) is less sensitive to variations in temperature or some other environmental variable. Additionally, the envelope values can be calculated in more computationally efficient fashion. One method of determining envelope values employs a known polynomial interpolation between local maxima in the signals. Because signal envelopes tend to vary less in time than the signals from which these envelopes are calculated, the interpolated envelopes can be down-sampled by discarding some of the interpolated data points. For example, every tenth data point can be retained, and the rest discarded. That is, equation (1) can then be evaluated for every tenth data point rather than every single one, thus reducing computational overhead.

Attention now turns to the time window used in equation (1), i.e., the time between t1 and t2. In at least some applications, it is desirable to select a time window within which the signals received by sensors 102 are most sensitive to bolt loosening but least sensitive to variations in environment variables. In some embodiments of the invention, this can be accomplished with an "optimization-type" approach, defining an objective function that compares the amount by which signals are affected by bolt loosening to the amount by which signals are affected by an environment variable, determining the time window that yields a maximum value of this objective function, and using that time window in equation (1).

Figure 4:
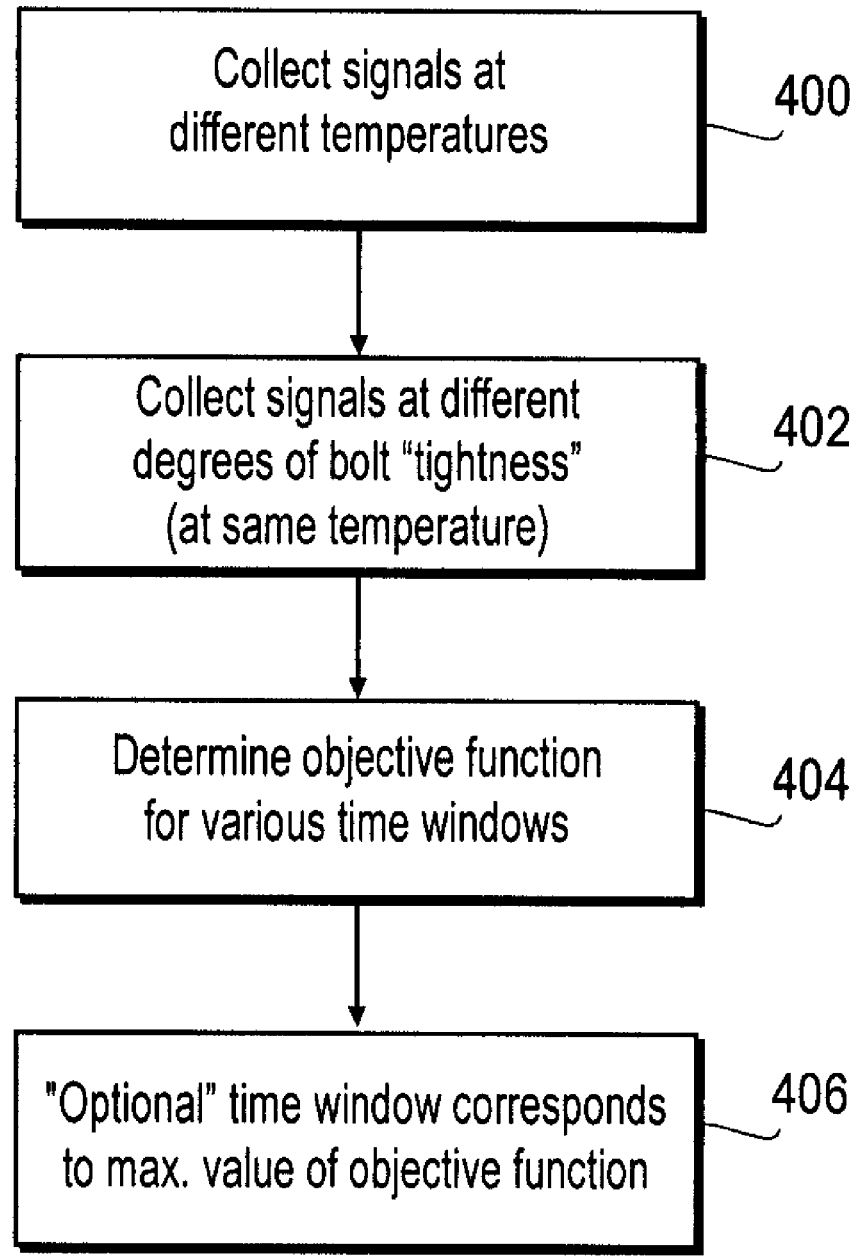
FIG. 4 is a flowchart of steps employed in determining an optimal time window for use in detecting fastener loosening.

FIG. 4 is a flowchart further illustrating this process. First, the microprocessor 108 (or data acquisition unit 118) transmits M signals at different values of the environment variable, and collects, samples, and stores the M resulting signals (step 400). Next, the microprocessor 108 or data acquisition unit 118 transmits N signals at different amounts of fastener tightness/looseness, at a constant value of the environment variable, and collects, samples, and stores the N resulting signals (step 402). The objective function is then determined for various time windows (step 404). The invention contemplates use of any suitable objective function, calculated in any manner. However, one objective function that has been found to beneficial is determined according to:

$$I_j = \frac{\sum_{n=1}^{N} \sum_{k=t_{j1}}^{t_{j2}} |y_n^e(k) - x_{m0}^e(k)|}{\sum_{m=1, m \neq m0}^{M} \sum_{k=t_{j1}}^{t_{j2}} |x_m^e(k) - x_{m0}^e(k)|} \quad (2)$$

where $x_m^e$ represents envelope values of the M stored signals, $x_{m0}^e$, represents envelope values for a baseline one of these M signals, i.e., the signal corresponding to a chosen "baseline" value of the environment variable, $y_n^e$ represents envelope values for the N stored signals, and t1 and t2 define the various time windows. While any time windows can be selected, it is often preferable to select a series of non-overlapping, adjacent time windows, for speed of computation.

In step 404, equation (2) is evaluated (i.e., $I_j$ is calculated) for each selected time window. It can be seen that the numerator of equation (2) is a measure of the amount by which the detected signals vary according to loosening of the fasteners, while the denominator of equation (2) is a measure of the amount by which the detected signals vary by the environment variable. Accordingly, for given M and N signals, the larger the value of $I_j$, the more the corresponding time window represents a portion of those M, N signals that is more sensitive to fastener loosening but less sensitive to variation in the environment variable. Thus, for any given set of time windows, the time window yielding the largest calculated value of $I_j$ is the time window over which the M, N signals are best able to yield an indication of fastener loosening without regard to variation in the environment variable. Thus, the "optimal" time window is selected as that corresponding to the maximum calculated value of $I_j$ (step 406). This "optimal" time window can then be used to detect fastener loosening in accordance with FIG. 3 and equation (1), above.

In some applications, the data related to different degrees of fastener loosening may not be available ($y_n^e(k)$ in equation (2)), or further reduction in computational overhead may be desired. Accordingly, embodiments of the invention can use a simplified version of the objective function $I_j$:

$$I_j = \frac{1}{\sum_{m=1, m \neq m0}^{M} \sum_{k=t_{j1}}^{t_{j2}} |x_m^e(k) - x_{m0}^e(k)|} \quad (3)$$

Equation (3) can then be used in the same manner as equation (2), eliminating the need to determine an amount of fastener loosening, as well as reducing computational overhead relative to equation (2).

One of ordinary skill in the art will realize that the term "optimal," as used above, need not necessarily refer to an exact mathematical optimum value. Rather, the "optimal" time window may, in some embodiments, refer only to the highest value of the objective function for those time windows chosen, regardless of whether other larger values of the objective function may exist for other methods, or other time windows besides those selected.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any index and/or objective function can be employed, employing any threshold values and definitions of environment variable. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting a loosening of a fastener on a structure, comprising:
   retrieving a first set of data corresponding to a first signal transmitted through a structure having a fastener;
   determining a second set of data corresponding to a second signal transmitted through the structure;
   calculating a value of an index according to the first set of data and the second set of data;
   comparing the calculated index value to a predetermined threshold value; and
   determining the loosening of the fastener according to the comparing;
   wherein the first signal is a baseline signal corresponding to a first degree of loosening of the fastener, and wherein the second signal is a subsequent signal transmitted through the structure subsequent to transmission of the first signal so as to facilitate determination of the loosening of the fastener subsequent to the transmission of the first signal.

2. The method of claim 1, wherein the first and second sets of data represent magnitude values of, respectively, a received signal corresponding to the first signal, and a received signal corresponding to the second signal.

3. The method of claim 2, wherein the first set of data represents an envelope of the received signal corresponding to the first signal, and wherein the second set of data represents an envelope of the received signal corresponding to the second signal.

4. The method of claim 3, wherein the index compares a difference between the first and second sets of data to a sum of one or more elements of the first and second sets of data.

5. The method of claim 4, wherein the index I is at least approximately:

$$I = \frac{\sum_{k=t1}^{t2} |y^e(k) - x^e(k)|}{\sum_{k=t1}^{t2} |x^e(k)| + \sum_{k=t1}^{t2} |y^e(k)|}$$

where $x^e$ represents the first set of data, $y^e$ represents the second set of data, t1 is a first time, and t2 is a second time.

6. The method of claim 1, wherein the threshold value is between approximately 0.1 and approximately 0.2.

7. The method of claim 1, wherein the fastener is a bolt.

8. The method of claim 1, wherein the calculating further comprises determining an optimal time window for use in determining the index.

9. The method of claim 8, wherein the determining an optimal time window further comprises:
   determining a third set of data corresponding to signals transmitted through the structure at different values of an environment variable;
   determining a fourth set of data corresponding to signals transmitted through the structure at different loosenings of the fastener;
   determining values of an objective function for various time windows, the objective function comparing a sensitivity of signals transmitted through the structure to the loosening of the fastener, to a sensitivity of signals transmitted through the structure to the environment variable; and
   determining the optimal time window according to a one of the various time windows corresponding to a maximum value of the objective function.

10. The method of claim 9, wherein:
   the determining a third set of data further comprises determining a third set of data corresponding to M signals transmitted through the structure at different values of an environment variable;
   the determining a fourth set of data further comprises determining a fourth set of data corresponding to N signals transmitted through the structure at different loosenings of the fastener; and
   the objective function $I_j$ is at least approximately:

$$I_j = \frac{\sum_{n=1}^{N} \sum_{k=t_{j1}}^{t_{j2}} |y_n^e(k) - x_{m0}^e(k)|}{\sum_{m=1, m \neq m0}^{M} \sum_{k=t_{j1}}^{t_{j2}} |x_m^e(k) - x_{m0}^e(k)|}$$

where $x_m^e$ represents the third set of data, $x_{m0}^e$ represents data from the third set of data corresponding to a baseline value of the environment variable, $y_n^e$ represents data from the fourth set of data, and t1 and t2 define the various time windows.

11. The method of claim 9, wherein the environment variable is a temperature of the structure.

12. The method of claim 8, wherein the determining an optimal time window further comprises:
   determining a third set of data corresponding to signals transmitted through the structure at different values of an environment variable;
   determining values of an objective function for various time windows, the objective function measuring a sensitivity of signals transmitted through the structure to the environment variable; and
   determining the optimal time window according to a one of the various time windows corresponding to a maximum value of the objective function.

13. The method of claim 12, wherein:
   the determining a third set of data further comprises determining a third set of data corresponding to M signals transmitted through the structure at different values of an environment variable; and the objective function $I_j$ is at least approximately:

$$I_j = \frac{1}{\sum_{m=1,m\neq m0}^{M} \sum_{k=t_{j1}}^{t_{j2}} |x_m^e(k) - x_{m0}^e(k)|}$$

where $x_m^e$ represents the third set of data, $x_{m0}^e$ represents data from the third set of data corresponding to a baseline value of the environment variable, and t1 and t2 define the various time windows.

14. The method of claim 12, wherein the environment variable is a temperature of the structure.

15. A method of detecting a loosening of a fastener on a structure, comprising:
   querying a structure by transmitting first signals through the structure;
   receiving first data corresponding to the transmitted first signals;
   retrieving second data corresponding to second signals transmitted through the structure;
   calculating a value of an index at least partially according to the first data and the second data;
   comparing the calculated index value to a threshold value; and
   determining a loosening of the fastener on the structure when the calculated index value exceeds the threshold value;
   wherein the second data is data representative of baseline signals corresponding to a first degree of loosening of the fastener, and wherein the first data is data representative of a subsequent signal transmitted through the structure subsequent to transmission of the second signals, so as to facilitate determination of the loosening of the fastener subsequent to the transmission of the second signals.

16. The method of claim 15, wherein the second signals are the baseline signals transmitted at a baseline value of an environment variable.

17. The method of claim 16, wherein the environment variable is a temperature of the structure.

18. The method of claim 15, wherein the first and second data represent, respectively, magnitude values of received signals corresponding to the transmitted first signals, and magnitude values of received signals corresponding to the transmitted second signals.

19. The method of claim 18, wherein the first data represents envelope values of the received signals corresponding to the transmitted first signals, and wherein the second data represents envelope values of the received signals corresponding to the transmitted second signals.

20. The method of claim 19, wherein the index compares a difference between the first and second data to a sum of one or more elements of the first and second data.

21. The method of claim 20, wherein the index I is at least approximately:

$$I = \frac{\sum_{k=t1}^{t2} |y^e(k) - x^e(k)|}{\sum_{k=t1}^{t2} |x^e(k)| + \sum_{k=t1}^{t2} |y^e(k)|}$$

where $x^e$ represents the first data, $y^e$ represents the second data, t1 is a first time, and t2 is a second time.

22. The method of claim 15, wherein the threshold value is between approximately 0.1 and approximately 0.2.

23. The method of claim 15, wherein the fastener is a bolt.

24. The method of claim 15, wherein the calculating further comprises determining an optimal time window for use in determining the index.

25. The method of claim 24, wherein the determining an optimal time window further comprises:
   determining third data corresponding to signals transmitted through the structure at different values of an environment variable;
   determining fourth data corresponding to signals transmitted through the structure at different loosenings of the fastener;
   determining values of an objective function for various time windows, the objective function comparing a sensitivity of signals transmitted through the structure to the loosening of the fastener, to a sensitivity of signals transmitted through the structure to the environment variable; and
   determining the optimal time window according to a one of the various time windows corresponding to a maximum value of the objective function.

26. The method of claim 25, wherein:
   the determining third data further comprises determining third data corresponding to M signals transmitted through the structure at different values of an environment variable;
   the determining fourth data further comprises determining fourth data corresponding to N signals transmitted through the structure at different loosenings of the fastener; and
   the objective function $I_j$ is at least approximately:

$$I_j = \frac{\sum_{n=1}^{N} \sum_{k=t_{j1}}^{t_{j2}} |y_n^e(k) - x_{m0}^e(k)|}{\sum_{m=1,m\neq m0}^{M} \sum_{k=t_{j1}}^{t_{j2}} |x_m^e(k) - x_{m0}^e(k)|}$$

where $x_m^e$ represents the third data, $x_{m0}^e$ represents data from the third data corresponding to a baseline value of the environment variable, $y_n^e$ represents the fourth data, and t1 and t2 define the various time windows.

27. The method of claim 25, wherein the environment variable is a temperature of the structure.

28. The method of claim 24, wherein the determining an optimal time window further comprises:
   determining third data corresponding to signals transmitted through the structure at different values of an environment variable;
   determining values of an objective function for various time windows, the objective function measuring a sensitivity of signals transmitted through the structure to the environment variable; and
   determining the optimal time window according to a one of the various time windows corresponding to a maximum value of the objective function.

29. The method of claim 28, wherein:
   the determining third data further comprises determining third data corresponding to M signals transmitted through the structure at different values of an environment variable; and the objective function $I_j$ is at least approximately:

$$I_j = \frac{1}{\sum_{m=1,m\neq m0}^{M} \sum_{k=t_{j1}}^{t_{j2}} |x_m^e(k) - x_{m0}^e(k)|}$$

where $x_m^e$ represents the third data, $x_{m0}^e$ represents data from the third data corresponding to a baseline value of the environment variable, and t1 and t2 define the various time windows.

30. The method of claim 28, wherein the environment variable is a temperature of the structure.

31. A method of determining an optimal time window for facilitating detection of a loosening of a fastener on a structure, comprising:
 determining a first set of data corresponding to first signals transmitted through the structure, differing ones of the first signals transmitted through the structure at differing values of an environment variable;
 determining values of an objective function for various time windows, wherein the respective values are determined at least partially according to a portion of the first set of data corresponding to the respective time window; and
 determining the optimal time window according to a one of the various time windows corresponding to a maximum one of the values.

32. The method of claim 31, wherein:
 the determining a first set of data further comprises determining a first set of data corresponding to M signals transmitted through the structure at different values of the environment variable; and
 the objective function $I_j$ is at least approximately:

$$I_j = \frac{1}{\sum_{m=1,m\neq m0}^{M} \sum_{k=t_{j1}}^{t_{j2}} |x_m^e(k) - x_{m0}^e(k)|}$$

where $x_m^e$ represents the first data, $x_{m0}^e$ represents data from the first data corresponding to a baseline value of the environment variable, and t1 and t2 define the various time windows.

33. The method of claim 31:
 further comprising determining a second set of data corresponding to second signals transmitted through the structure, differing ones of the second signals transmitted through the structure at differing loosenings of the fastener;
 wherein the respective values are determined at least partially according to a portion of the first set of data corresponding to the respective time window and a portion of the second set of data corresponding to the respective time window.

34. The method of claim 33, wherein:
 the determining a first set of data further comprises determining a first set of data corresponding to M signals transmitted through the structure at different values of the environment variable;
 the determining a second set of data further comprises determining a second set of data corresponding to N signals transmitted through the structure at different loosenings of the fastener; and the objective function $I_j$ is at least approximately:

$$I_j = \frac{\sum_{n=1}^{N} \sum_{k=t_{j1}}^{t_{j2}} |y_n^e(k) - x_{m0}^e(k)|}{\sum_{m=1,m\neq m0}^{M} \sum_{k=t_{j1}}^{t_{j2}} |x_m^e(k) - x_{m0}^e(k)|}$$

where $x_m^e$ represents the first data, $x_{m0}^e$ represents data from the first data corresponding to a baseline value of the environment variable, $y_n^e$ represents the second data, and t1 and t2 define the various time windows.

35. The method of claim 31, wherein the environment variable is a temperature of the structure.

36. A non-transitory computer readable medium containing computer instructions stored therein for causing a computer processor to perform a method of detecting a loosening of a fastener on a structure, the method comprising:
 retrieving a first set of data corresponding to a first signal transmitted through a structure having a fastener;
 determining a second set of data corresponding to a second signal transmitted through the structure;
 calculating a value of an index according to the first set of data and the second set of data;
 comparing the calculated index value to a predetermined threshold value; and
 determining the loosening of the fastener according to the comparing;
 wherein the first signal is a baseline signal corresponding to a first degree of loosening of the fastener, and wherein the second signal is a subsequent signal transmitted through the structure subsequent to transmission of the first signal so as to facilitate determination of the loosening of the fastener subsequent to the transmission of the first signal.

37. The non-transitory computer-readable medium of claim 36, wherein the first and second sets of data represent magnitude values of, respectively, a received signal corresponding to the first signal, and a received signal corresponding to the second signal.

38. The non-transitory computer-readable medium of claim 37, wherein the first set of data represents an envelope of the received signal corresponding to the first signal, and wherein the second set of data represents an envelope of the received signal corresponding to the second signal.

39. The non-transitory computer-readable medium of claim 38, wherein the index compares a difference between the first and second sets of data to a sum of one or more elements of the first and second sets of data.

40. The non-transitory computer-readable medium of claim 39, wherein the index I is at least approximately:

$$I = \frac{\sum_{k=t1}^{t2} |y^e(k) - x^e(k)|}{\sum_{k=t1}^{t2} |x^e(k)| + \sum_{k=t1}^{t2} |y^e(k)|}$$

where $x^e$ represents the first set of data, $y^e$ represents the second set of data, t1 is a first time, and t2 is a second time.

41. The non-transitory computer-readable medium of claim 36, wherein the threshold value is between approximately 0.1 and approximately 0.2.

42. The non-transitory computer-readable medium of claim 36, wherein the fastener is a bolt.

43. The non-transitory computer-readable medium of claim 36, wherein the calculating further comprises determining an optimal time window for use in determining the index.

44. The non-transitory computer-readable medium of claim 34, wherein the determining an optimal time window further comprises:
- determining a third set of data corresponding to signals transmitted through the structure at different values of an environment variable;
- determining a fourth set of data corresponding to signals transmitted through the structure at different loosenings of the fastener;
- determining values of an objective function for various time windows, the objective function comparing a sensitivity of signals transmitted through the structure to the loosening of the fastener, to a sensitivity of signals transmitted through the structure to the environment variable; and
- determining the optimal time window according to a one of the various time windows corresponding to a maximum value of the objective function.

45. The non-transitory computer-readable medium of claim 44, wherein:
- the determining a third set of data further comprises determining a third set of data corresponding to M signals transmitted through the structure at different values of an environment variable;
- the determining a fourth set of data further comprises determining a fourth set of data corresponding to N signals transmitted through the structure at different loosenings of the fastener; and
- the objective function $I_j$ is at least approximately:

$$I_j = \frac{\sum_{n=1}^{N} \sum_{k=t_{j1}}^{t_{j2}} |y_n^e(k) - x_{m0}^e(k)|}{\sum_{m=1, m \neq m0}^{M} \sum_{k=t_{j1}}^{t_{j2}} |x_m^e(k) - x_{m0}^e(k)|}$$

where $x_m^e$ represents the third set of data, $x_{m0}^e$ represents data from the third set of data corresponding to a baseline value of the environment variable, $y_n^e$ represents data from the fourth set of data, and t1 and t2 define the various time windows.

46. The non-transitory computer-readable medium of claim 44, wherein the environment variable is a temperature of the structure.

47. The non-transitory computer-readable medium of claim 43, wherein the determining an optimal time window further comprises:
- determining a third set of data corresponding to signals transmitted through the structure at different values of an environment variable;
- determining values of an objective function for various time windows, the objective function measuring a sensitivity of signals transmitted through the structure to the environment variable; and
- determining the optimal time window according to a one of the various time windows corresponding to a maximum value of the objective function.

48. The non-transitory computer-readable medium of claim 47, wherein:
- the determining a third set of data further comprises determining a third set of data corresponding to M signals transmitted through the structure at different values of an environment variable; and
- the objective function $I_j$ is at least approximately:

$$I_j = \frac{1}{\sum_{m=1, m \neq m0}^{M} \sum_{k=t_{j1}}^{t_{j2}} |x_m^e(k) - x_{m0}^e(k)|}$$

where $x_m^e$ represents the third set of data, $x_{m0}^e$ represents data from the third set of data corresponding to a baseline value of the environment variable, and t1 and t2 define the various time windows.

49. The non-transitory computer-readable medium of claim 47, wherein the environment variable is a temperature of the structure.

\* \* \* \* \*